3,817,699
INDAMINES, PROCESS FOR PRODUCING THE SAME AND COMPOSITIONS CONTAINING INDAMINES AND PROCESSES FOR DYEING KERATINOUS FIBERS USING SAID COMPOSITIONS
Gregoire Kalopissis, Paris, Andree Bugaut, Boulogne-sur-Seine, and Francoise Estradier, Paris, France, assignors to Societe Anonyme dite: L'Oreal, Paris, France
No Drawing. Filed Sept. 14, 1971, Ser. No. 180,457
Claims priority, application France, Sept. 18, 1970, 7034042
Int. Cl. A61k 7/12
U.S. Cl. 8—10.1                10 Claims

ABSTRACT OF THE DISCLOSURE

Indamine having the formula

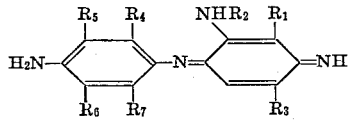

wherein $R_1$, $R_3$, $R_4$, $R_5$, $R_6$ and $R_7$ each represent hydrogen, a lower alkyl or lower alkoxy and $R_2$ represents hydrogen or a lower acyl, and their acid addition salts and their double zinc salts are usefully employed for dyeing keratinous fibers and, in particular, human hair. The indamines can be in a tautomeric form of that represented above.

---

The present invention relates to novel indamines having formula:

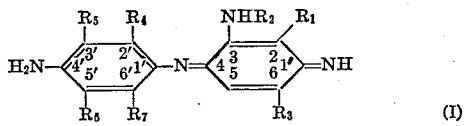

wherein $R_1$, $R_3$, $R_4$, $R_5$, $R_6$ and $R_7$ each independently represent a member selected from the group consisting of hydrogen, lower alkyl having 1–6 carbon atoms and lower alkoxy having 1–6 carbon atoms and $R_2$ represents a member selected from the group consisting of hydrogen and lower acyl having 1–6 carbon atoms and to the salts formed by these indamines with organic or inorganic acids, in particular, their acetates, hydrochlorides, persulfates, perchlorates and the double zinc salts of these compounds, which can, of course, be in a tautomeric form of that represented by formula (I).

Generally, the indamines of formula (I) are isolated in the form of their salts, these latter generally being more easy to obtain because of solubility.

The indamines or indamine salts of formula (I) can be prepared by condensing a compound having the formula

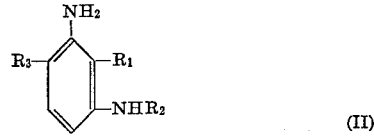

wherein $R_1$, $R_2$, $R_3$ have the meaning given above on a paraphenylenediamine having the formula

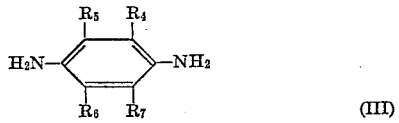

where $R_4$, $R_5$, $R_6$, $R_7$ also have the meaning given above. The condensation reaction can be carried out in an alkaline aqueous or aqueous-acetonic medium in the presence of an oxidizing agent. The initial reactants, represented by formulae II and III above can be used in the form of one of their salts. If necessary or desirable, the resulting indamine or indamine salt can be further transformed into the desired indamine salt.

The oxidizing agent used in the above condensation reaction is advantageously hydrogen peroxide, a peroxy salt and, in particular, an alkaline persulfate or ammonium persulfate, the use of the latter facilitating the isolation of the indamine of formula I in the form of an insoluble persulfate.

When the oxidizing agent used is hydrogen peroxide and it is desired to obtain an indamine salt that is relatively insoluble in water, the above condensation can be followed by addition to the reaction mixture either of an acid corresponding to the desired salt, or of a salt of that acid which is more soluble in water than the desired indamine salt, for example, ammonium persulfate.

It has further been noted that even when it is desired to prepare an indamine persulfate, it is often advantageous to proceed in two stages, the first stage comprising carrying out the condensation in the presence of hydrogen peroxide and the second stage comprising adding ammonium persulfate or an alkaline persulfate to the reaction mixture.

When it is desired to obtain indamine salts which are very soluble in water, it is necessary to produce these salts in a two stage operation. In the first stage, there is prepared an indamine salt such as a persulfate or a hydrochloride which is relatively insoluble and, therefore, can be isolated. In the second stage, this salt is heated with an alkaline solution from which the indamine of formula I can be extracted with a suitable solvent. This indamine can then be changed into the desired salt by the addition of the corresponding acid to the solvent phase. This way of operating is particularly applicable when it is desired to prepare an acetate of the indamine.

When it is desired to obtain an indamine of formula (I), which is not salified and which is insoluble in water, the condensation reaction is preferably performed in the presence of hydrogen peroxide and the resulting indamine is separated from the reaction medium by any suitable technique, for example, by filtering.

On the other hand, when it is desired to obtain an indamine of formula (I) which is so soluble in water that its direct isolation from the reaction medium is not feasible, the indamine, after being prepared by the above condensation reaction in the presence of hydrogen peroxide, is converted, in a first stage, into a water insoluble salt thereof such as its persulfate or its hydrochloride, by operating in the way described above. The salt thus formed is isolated as by filtering, for instance, and then in a second stage is treated with a concentrated alkaline solution, operating in a minimum of water. Finally, if necessary or desirable, the indamine is extracted with a suitable solvent such as chloroform or methylisobutylketone.

To obtain double salts of zinc and the indamine of formula (I), it suffices to add an aqueous solution of a suitable zinc salt to an aqueous solution of soluble indamine salts.

Representative paraphenylenediamines that can be used in accordance with the present invention are, for example, paraphenylenediamine, paratoluylenediamine, 2,5-diaminoanisole, 2,5 - diaminochlorobenzene, 2 - methoxy-5-methyl paraphenylenediamine, 2,6 - dimethyl-3-methoxy paraphenylenediamine and 1,4-diaminodurene.

Compounds representative of those having formula II above include, for instance, 2,4-diaminoanisole, 2,4-diaminobenzene, 3-amino-4-methyl acetanilide and meta amino acetanilide.

The condensation reaction is generally carried out at atmospheric pressure and at a temperature ranging from about −10° C. to 30° C. Generally, the paraphenylene diamine and the compound represented by formula II are employed in essentially equimolar amounts. When the reaction medium is an alkaline aqueous acetonic solution, acetone can comprise between about 10 to 30 weight percent of the medium. The alkalinizing agent, which can be ammonia or an organic amine, such as monoethanolamine, is present in amounts such that the pH is about 8 to 10. The oxidizing agent is generally present in amounts at least equal to the theoretical amount necessary for making the desired quinone diimine.

Further, it is possible to prepare the indamines of formula (I) wherein at least two of the radicals $R_4$, $R_5$, $R_6$ and $R_7$ are other than hydrogen and the salts of these indamines, by condensing a compound having the formula (II) on a benzoquinonediimine having the formula

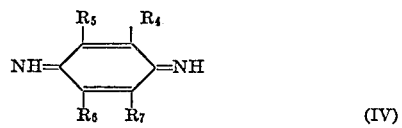

(IV)

wherein $R_4$, $R_5$, $R_6$, $R_7$ have the meaning indicated above with the proviso, however, that at least two of these radicals are other than hydrogen. The condensation is carried out either in an aqueous medium, or in an inert organic solvent such as methylisobutylketone, dioxane or benzene. Optionally, there can be present in the reaction medium, when an indamine salt is desired, an acid corresponding to this desired salt.

When the condensation is performed in water, it is possible, by addition to the reaction mixture of a salt such as sodium chloride, ammonium persulfate and sodium perchlorate, to isolate the resulting indamine in the form of a relatively water-insoluble salt.

When it is desired to prepare indamine salts that are very soluble in water, the condensation reaction is preferably performed in an organic solvent such as methyl isobutyl ketone or the like. Then the acid corresponding to the desired salt, for example, acetic acid or propionic acid, is added to the solvent.

Generally, in this embodiment of the present invention the benzoquinone diimine and the compound represented by formula II are also used in essentially equimolar amounts and the condensation reaction is carried out usually at atmospheric pressure and at a temperature ranging from about −10° C. to 25° C.

The indamines according to the present invention, and their salts, constitute dyes which have a great dyeing power in a broad pH range, which can range from pH to pH 10. Because of their great affinity for keratinous fibers, very slight concentrations of these dyes are sufficient to obtain intense shades, which explains why those salts thereof which are relatively insoluble in water, such as the persulfates and certain chlorides, are perfectly usable.

Consequently, the present invention also provides novel dyeing composition for keratinous fibers, in particular, for human hair, characterized by the fact that it contains in solution at least one compound represented by formula I or a salt of this compound.

The dye compositions according to the invention can contain only the compounds of formula I, in which case they make it possible to obtain on white hair tints which go from violet blue to green, after an extremely short application period, of the order of three minutes at ambient temperature.

Because of the great dyeing power of the novel compounds of formula (I) their concentration in the compositions according to the invention can, as said above, be extremely slight, of the order of 0.002% by weight. However, this concentration can vary from about 0.002 to 1% by weight.

The compositions according to the invention can also contain other direct dyes, for example, anthraquinone dyes, nitro dyes of the benzene series, indoanilines, indophenols or indamines other than those of formula (I).

The compositions according to the invention make it possible to obtain shades rich in glints which often give the hair a pearly appearance.

The dye compositions according to the invention are generally in the form of aqueous or aqueous alcohol solutions which can easily be prepared by dissolving in water one or more compounds of formula I in mixture or not with other direct dyes. However, they can also contain thickeners and be in the form of creams or gels. When an alcohol solution is employed generally, the alcohol will be a lower alkanol such as ethanol or isopropanol, the alkanol being present in the aqueous solution in amounts of about 20 to 70 percent by weight thereof.

The compositions according to the invention can further contain various ingredients usually used in cosmetics, for example, wetting agents, dispersing agents, swelling agents, penetrating agents, softeners or perfumes. They can also be packaged under pressure in aerosol bombs or containers, together with a conventional aerosol propellant such a dichlorodifluoromethane, trichloromonofluoromethane and their mixtures. Obviously, other conventional aerosol propellants can also be used.

The pH of the dye compositions according to the invention can vary between 4 and 10. Preferably, however, the pH ranges between about 6–9.

Dyeing of keratinous fibers, in particular human hair, with dye compositions according to the invention, can be performed in the usual way by application of the composition to the fibers to be dyed, the composition being left in contact with the fibers for a time varying from about 3 to 30 minutes. Following this application, the fibers are rinsed and, if desired, washed. Thereafter, the thus treated fibers are dried.

In another embodiment of the present invention, the novel indamines can be employed in the production of capillary hair-setting lotions. These lotions comprise an aqueous alcohol solution, at least one cosmetic resin and at least one indamine of formula I or a salt thereof. The amount of indamine present in the hair-setting lotion of the present invention can be extremely low. Such an amount generally ranges between about 0.002 to 0.5% by weight of the total hair-setting lotion composition.

Representative cosmetic resins that can be employed in the hair-setting lotion composition of the present invention include, for instance, polyvinyl-pyrrolidone having a molecular weight ranging from about 10,000–70,000, copolymer of crotonic acid and vinyl acetate, copolymer of vinylpyrrolidone and vinyl acetate wherein the ratio of PVP to PVA ranges between 50–70:50–30, copolymer of maleic anhydride and butylvinyl ether and the like. These resins are utilized in a proportion of about 1 to 3% by weight.

The alcohols suitable for the preparation of the hair-setting lotions of the invention are low molecular weight alkanols, preferably ethanol or isopropanol which are present in amounts of about 20% to 50% by weight of the total hair-setting lotion composition. The pH of the hair-setting lotion of the invention can range from about 4–10 and preferably between about 6–8.

Hair-setting lotions of the present invention that contain only indamines of the present invention are shading or tinting compositions which make it possible to impart to the hair extremely luminous glints and often to give them a pearly or iridescent appearance.

However, the hair-setting lotions of this invention can also contain other direct dyes, for example, anthraquinone dyes, nitro dyes of the benzene series, indoanilines, indophenols or again other indamines. These lotions are used in the customary way by applying the same to wet human hair which has been previously washed and rinsed, followed by rolling up and drying of the air.

The following examples are intended to illustrate the various aspects of the present invention. Unless otherwise specified, all parts and percentages are by weight and all temperatures are expressed in degrees centigrade.

EXAMPLE 1

The monohydrate of the acetate of N-[(4'-amino-2'-methoxy-5'-methyl)phenyl] - 3-amino-6-methoxy benzoquinonediimine is prepared as follows:

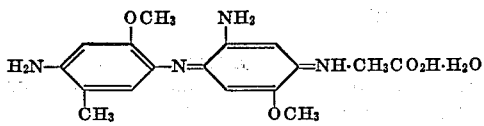

0.04 mole (6 g.) of 2-methyl-5-methoxy benzoquinone diimine is dissolved in 160 cc. of methylisobutyl ketone. There is then immediately added to this solution 0.04 mole (5.52 g.) of 2,4-diaminoanisole in 120 cc. of methylisobutylketone to which are added 4.4 cc. of acetic acid. The resulting above indamine precipitates and is filtered from the reaction medium. Thereafter, the precipitate is washed with a little acetone and dried. 4.30 g. of chromatographically pure indamine acetate, crystallized in monohydrate form and melting at 135° C. are thus recovered.

Molecular mass calculated for $C_{17}H_{22}N_4O_4 \cdot H_2O$: 364.

Molecular mass found by potentiometric measurement by perchloric acid in acetic acid: 357.

| Analysis | Calculated for—$C_{17}H_{22}N_4O_4 \cdot H_2O$ | Found | |
|---|---|---|---|
| Percent: | | | |
| C | 56.04 | 56.59 | 56.79 |
| H | 6.59 | 6.42 | 6.47 |
| N | 15.38 | 15.34 | 15.17 |

EXAMPLE 2

The semihydrate of the acetate of N-[(4'-amino-2'-methoxy-5'-methyl)phenyl]-3 - amino 6 - methyl benzoquinone diimine is prepared as follows:

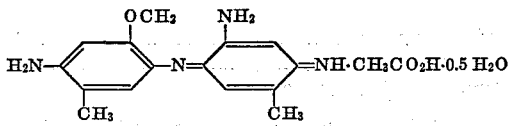

0.033 mole (5 g.) of 2-methyl-5-methoxy benzoquinone diimine is dissolved in 80 cc. of methylisobutylketone. There is then immediately added to this solution 0.033 mole (4.03 g.) of 2,4-diaminotoluene in solution in 80 cc. of methylisobutylketone to which have been added 3.8 cc. of acetic acid. The resulting above indamine precipitates and is filtered from the reaction medium, washed with a little methylisobutylketone and dried. 4.6 grams of chromatographically pure indamine acetate, crystallized in semihydrate form and melting at 138° are thus recovered.

| Analysis | Calculated for—$C_{17}H_{22}O_2N_4 \cdot 0.5H_2O$ | Found | |
|---|---|---|---|
| Percent: | | | |
| C | 60.18 | 59.89 | 60.17 |
| H | 6.73 | 6.81 | 6.89 |
| N | 16.52 | 16.48 | 16.47 |

EXAMPLE 3

The hydrochloride of N-[(4'-amino-2' - methoxy - 5'-methyl)phenyl]-3-amino-6 - methyl benzoquinonediimine is prepared as follows:

0.01 mole (3.39 g.) of indamine acetate, prepared as in Example 2, is dissolved in 10 cc. of ice water to which are added 3 cc. of ammonia at 22° Bé. This solution is saturated with sodium chloride and after 20 minutes of cooling at 0°, the above indamine is filtered from the raection medium in the form of beautiful green crystals. 2.5 g. of this desired indamine hydrochloride which is chromatographically pure are thus recovered.

EXAMPLE 4

N-[(4'-amino - 2' - methoxy - 5' - methyl)phenyl] - 3-amino - 6 - methyl benzoquinoneimine is prepared as follows:

0.01 mole (3.39 g.) of indamine acetate, prepared as in Example 2, is dissolved in 10 cc. of ice water to which have been added 3 cc. of ammonia at 22°Bé. The ammonia solution is immediately extracted with chloroform. The chloroform phase is washed with water and petroleum ether is added thereto in a volume amount equaling the chloroform phase. The above indamine is then filtered therefrom in the form of deep garnet crystals. 1.5 g. of chromatographically pure indamine which melts at 164° after drying under a vacuum are thus recovered.

Molecular mass calculated for $C_{15}H_{18}ON_4$: 270.

Molecular mass found by potentiometric determination by perchloric acid in acetic acid: 278.

EXAMPLE 5

The double chloride of zinc and N-[4' - amino - 2'-methoxy-5'-methyl)phenyl]-3-amino - 6 - methyl benzoquinonediimine is prepared as follows:

The indamine acetate of Example 2 is dissolved in a minimum of water. Then a concentrated aqueous solution of zinc chloride is added. The desired double chloride of zinc and indamine immediately precipitates in the form of green crystals with golden glints which is then filtered and washed with a little water and ethanol. This product is chromatographically pure.

Zn percent calculated for $C_{15}H_{20}ON_4Cl_4Zn$: 13.6.

Zn percent found: 13.3.

EXAMPLE 6

The acetate of N-[(4'-amino-2'-methoxy - 5' - methyl) phenyl]-3-amino-2,6-dimethyl benzoquinone diimine is prepared as follows:

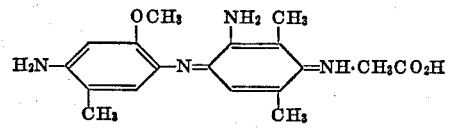

0.0282 mole (4.23 g.) of 2-methyl 5-methoxy-benzoquinonediimine is dissolved in 120 cc. of methylisobutylketone. There is then immediately added to this solution 0.0282 mole (3.83 g.) of 1,3-dimethyl-2,4-diamino benzene (melting point=66° C.) in 60 cc. of methylisobutylketone to which are added 3.25 cc. of acetic acid. 4.6 g. of chromatographically pure indamine acetate precipitate and are immediately filtered and are dried for 8 days under vacuum. The above indamine melts at 172°.

| Analysis | Calculated for—$C_{18}H_{24}N_4O_3$ | Found | |
|---|---|---|---|
| Percent: | | | |
| C | 62.77 | 62.46 | 62.53 |
| H | 7.02 | 6.97 | 7.06 |
| N | 16.27 | 16.08 | 16.12 |

Molecular mass calculated for $C_{18}H_{24}N_4O_3$: 344.

Molecular mass found by potentiometric determination by perchloric acid in acetic acid: 348.

EXAMPLE 7

The acetate of N-[(4'-amino-2'-methoxy-3',5'-dimethyl)phenyl]-3-amino-2,6-dimethyl benzoquinone diimine is prepared as follows:

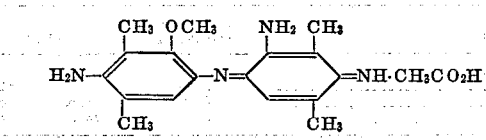

0.037 mole (0.606 g.) of 2,6-dimethyl-3-methoxy benzoquinone diimine is dissolved in 15 cc. of methylisobutylketone. To this solution there is immediately added 0.037 mole of 1,3-dimethyl-2,6-diamino benzene in solution in 12 cc. of methylisobutylketone to which has been added 0.4 cc. acetic acid. 0.37 g. of indamine acetate precipitates in crystalline form and is filtered from the reaction medium. The resulting inamine is washed with a little methylisobutylketone and dried under vacuum. It is chromatographically pure and melts at 164°.

Molecular mass calculated for $C_{19}H_{26}O_3N_4$: 358.

Molecular mass found by poteniometric determination by perchloric acid in acetic acid: 355.

| Analysis | Calculated for— $C_{19}H_{26}O_3N_4$ | Found | |
|---|---|---|---|
| Percent: | | | |
| C | 63.68 | 63.40 | 63.52 |
| H | 7.26 | 7.32 | 7.24 |
| N | 15.64 | 15.50 | 15.48 |

EXAMPLE 8

The persulfate of N-[(4'-amino-2'-methoxy-3',5'-dimethyl)phenyl]-3-acetylamino-6-methyl benzoquinonediimine is prepared as follows:

To a solution of 0.03 mole (7.17 g.) of the dihydrochloride of 2,6-dimethyl-3-methoxy paraphenylenediamine in 20 cc. of water to which are added 20 cc. of ammonia at 22° Bé. there are added, on the one hand, 0.03 mole (4.92 g.) of 3-amino-4-methyl acetanilide in solution in 40 cc. of acetone and, on the other hand, 50 cc. of 50 volume hydrogen peroxide. The reaction mixture is left at ambient temperature for 15 minutes and cooled to 0°. Acetic acid in amounts sufficient to obtain a pH of 8 is added thereto. Then a saturated aqueous solution of ammonium persulfate is added. The desired indamine persulfate immediately precipitates in the form of beautiful green crystals with golden glints. The crystals are filtered, washed with a little water and then with acetone. After drying under vacuum, 4.86 g. of chromatographically pure indamine persulfate are obtained.

EXAMPLE 9

The acetate of N-[(4'-amino-2-methoxy-3',5'-dimethyl) phenyl]-3-acetylamino-6-methyl benzoquinone diimine is prepared as follows:

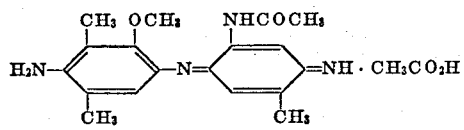

2 g. of indamine persulfate, prepared according to Example 8, are introduced with stirring into 40 cc. of an iced 0.2 N sodium hydroxide solution. The indamine, released with methylisobutylketone, is immediately extracted. The solvent, which has a strong purple coloring, is washed with a little water. Then acetic acid is added drop by drop until it turns blue. The desired indamine acetate immediately precipitates in crystallized form. 1.2 g. of the indamine acetate are then recovered by filtration and dried under vacuum. The indamine thus prepared is chromatographically pure and melts with decomposition at 157°.

| Analysis | Calculated for— $C_{20}H_{28}N_4O_4$ | Found | |
|---|---|---|---|
| Percent: | | | |
| C | 62.16 | 62.16 | 62.10 |
| H | 6.78 | 6.68 | 6.60 |
| N | 14.50 | 14.55 | 14.30 |

EXAMPLE 10

The perchlorate of N - [(4'-amino-2-methoxy-3',5'-dimethyl)phenyl] - 3-acetylamino benzoquinonediimine is prepared as follows:

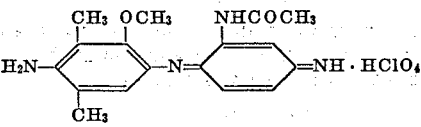

0.01 mole (1.865 g.) of metaaminoacetanilide hydrochloride is dissolved in 6 cc. of water. 1 cc. of ammonia at 22° Bé. is added to this solution. Then there is added a solution, prepared at the moment of use, of 0.01 mole (1.64 g.) of 2,6-dimethyl-3-methoxy benzoquinone diimine in 6 cc. of ice water. The reaction mixture instantly takes on an intense green coloring. A solution of 1.6 g. of sodium perchlorate in 3 cc. of water is added. The above indamine precipitates and is filtered from the reaction medium after which it is washed with a little water and dried. 2.5 g. of the desire inamine perchlorate which is chromatographically pure are thus recovered.

EXAMPLE 11

The following hair-setting lotion composition is prepared:

|  | G. |
|---|---|
| Dye of Example 1 | 0.02 |
| Vinyl acetate-crotonic acid copolymer (90% vinyl acetate, 10% crotonic acid—molecular weight, 45,000 to 50,000) | 2 |
| Ethanol-96° titer, q.s.q., 50°. | |
| Water, q.s.q. | 100 |
| Triethanolamine, q.s.q., pH 7. | |

This hair-setting lotion when applied to bleached hair imparts thereto a clear silvery blue shade.

EXAMPLE 12

The following dye composition is prepared:

|  | G. |
|---|---|
| Dye of Example 1 | 0.005 |
| Water, q.s.q. | 100 |
| Ammonia at 22° Bé., q.s.q., pH 10. | |

This composition when applied to bleached hair for three minutes, imparts thereto after rinsing and shampooing, a very clear pearly blue shade.

EXAMPLE 13

The following hair-setting lotion composition is prepared:

|  | G. |
|---|---|
| Dye of Example 1 | 0.02 |
| N - [(4' - hydroxy - 3',5'--dimethyl)phenyl]-2,6-dimethyl benzoquinoneimine | 0.1 |
| Vinyl acetate-crotonic acid copolymer (vinyl acetate 90%, crotonic acid, 10%—molecular weight 45,000) | 2 |
| Ethyl alcohol, 96° titer, q.s.p. 50° C. | |
| Water, q.s.q. | 100 |
| Triethanolamine, q.s.q. pH 7. | |

This hair-setting lotion when applied to brown hair imparts thereto clear parma shade.

EXAMPLE 14

The following hair-lotion composition is prepared:

|  | G. |
|---|---|
| Dye of Example 1 | 0.2 |
| Vinyl-acetate-crotonic acid copolymer (vinyl acetate, 90%, crotonic acid, 10%—molecular weight 45,000) | 2 |
| Ethyl alcohol 96° titer, q.s.q., 50°. | |
| Water, q.s.q. | 100 |
| Triethannolamine, q.s.q., pH 7. | |

EXAMPLE 15

The following dye composition is prepared:

| | G. |
|---|---|
| Dye of Example 1 | 0.02 |
| Nitro-orthophenylene diamine | 0.1 |
| Ethyl alcohol, 96° titer | 20 |
| Water, q.s.p. | 100 |
| Ammonia, 22° Bé., q.s.p., pH 10. | |

This dye composition when applied to 95% naturally white hair for 20 minutes imparts thereto a green shade, after using and shampooing.

EXAMPLE 16

The following hair-setting lotion is prepared:

| | G. |
|---|---|
| Dye of Example 2 | 0.05 |
| Vinyl acetate-crotonic acid copolymer (vinyl acetate, 90%, crotonic acid, 10%—molecular weight 45,000) | 2 |
| Isopropyl alcohol, 96% titer, q.s.p., 50° | |
| Water, q.s.p. | 100 |
| Triethanolamine, q.s.p., pH 7. | |

This hair-setting lotion when applied to bleached hair imparts thereto a blue shade with pearly glints.

EXAMPLE 17

The following hair-setting lotion is prepared:

| | G. |
|---|---|
| Dye of Example 2 | 0.02 |
| N-[(2',4'-diamino-5'-methoxy)phenyl] benzoquinoneimine | 0.02 |
| Vinyl acetate-crotonic acid copolymer (vinyl acetate, 90%, crotonic acid, 10%—molecular weight 45,000) | 2 |
| Ethyl alcohol, 96° titer, q.s.p., 50°. | |
| Water, q.s.p. | 100 |
| Triethanolamine, q.s.p., pH 7. | |

This hair-setting lotion when applied to bleached hair imparts thereto a gray blue shade.

EXAMPLE 18

The following dye composition is prepared:

| | G. |
|---|---|
| Dye of Example 3 | 0.15 |
| Water, q.s.p. | 100 |
| Ammonia at 22° Bé., q.s.p., pH 8. | |

This dye composition when applied to 95% naturally white hair for 10 minutes, after rinsing and shampooing, imparts thereto a deep blue coloring.

EXAMPLE 19

The following hair setting lotion composition is prepared:

| | G. |
|---|---|
| Dye of Example 5 | 0.1 |
| Vinyl acetate-crotonic acid copolymer (vinyl acetate, 90%, crotonic acid, 10%—molecular weight 45,000) | 2 |
| Ethyl alcohol, 96° titer, q.s.p., 50°. | |
| Water, q.s.p. | 100 |
| Triethanolamine, q.s.p., pH 7. | |

This hair setting lotion when applied to bleached hair imparts thereto a blue shade.

EXAMPLE 20

The following dye composition is prepared:

| | G. |
|---|---|
| Dye of Example 6 | 0.2 |
| Butylglycol | 5 |
| Lauryl alcohol oxyethylenated with 10.5 moles of ethylene oxide | 5 |
| Water, q.s.p. | 100 |

This dye composition when applied to 60% naturally white hair for 20 minutes, after rinsing and shampooing imparts thereto a deep Prussian blue coloring.

EXAMPLE 21

The following hair-setting lotion composition is prepared:

| | G. |
|---|---|
| Dye of Example 6 | 0.05 |
| N-[(4'-hydroxy)phenyl]-3-amino-6-methyl benzoquinoneimine | 0.2 |
| Vinyl acetate-crotonic acid copolymer (vinyl acetate, 90%, crotonic acid, 10%—molecular weight 45,000) | 2 |
| Ethyl alcohol, 96° titer, q.s.p., 50°. | |
| Water, q.s.p. | 100 |
| Triethanolamine, q.s.p., pH 7. | |

This hair-setting lotion when applied to bleached hair imparts thereto a clear bronze shade.

EXAMPLE 22

The following dye composition is prepared:

| | G. |
|---|---|
| Dye of Example 7 | 0.02 |
| Water, q.s.p. | 100 |
| Ammonia, at 22° Bé., q.s.p., pH 7. | |

This dye composition when applied to 95% naturally white hair for 20 minutes, after rinsing and shampooing, imparts thereto a very luminous blue shade with silvery glints.

EXAMPLE 23

The following dye composition is prepared:

| | G. |
|---|---|
| Dye of Example 7 | 0.02 |
| N-[(2',4'-diamino-5'-methoxy)phenyl] benzoquinone | 0.2 |
| Water, q.s.p. | 100 |

This dye composition when applied to 95% naturally white hair for 20 minutes, after rinsing and shampooing, imparts thereto a violet shade with iridescent glints.

EXAMPLE 24

The following hair setting lotion composition is prepared:

| | G. |
|---|---|
| Dye of Example 8 | 0.1 |
| Vinyl acetate-crotonic acid copolymer (vinyl acetate, 90%, crotonic acid, 10%—molecular weight 45,000) | 2 |
| Ethyl alcohol, 96° titer, q.s.p., 50°. | |
| Water, q.s.p. | 100 |

This hair setting lotion when applied to bleached hair imparts thereto a green shade.

EXAMPLE 25

The following hair-setting lotion composition is prepared:

| | G. |
|---|---|
| Dye of Example 9 | 0.1 |
| Vinyl acetate-crotonic acid copolymer (vinyl acetate, 90%, crotonic acid, 10%—molecular weight 45,000) | 2 |
| Ethyl alcohol, 96° titer, q.s.p. for 50°. | |
| Water, q.s.p. | 100 |
| Triethanolamine, q.s.p., pH 7. | |

This hair-setting lotion when applied to bleached hair imparts thereto a blue green shade.

EXAMPLE 26

The following dye composition is prepared:

| | G. |
|---|---|
| Dye of Example 10 | 0.1 |

| | G. |
|---|---|
| Ethyl alcohol, 96° titer | 50 |
| Water, q.s.p. | 100 |

This dye composition when applied to bleached hair for 20 minutes, after rinsing and shampooing, imparts thereto a green shade.

EXAMPLE 27

The following hair dye composition is prepared:

| | G. |
|---|---|
| Dye of Example 6 | 0.2 |
| Ethyl alcohol, 96° titer | 20 |
| Water, q.s.p. | 100 |

1% lactic acid sufficient for pH 4.

This hair dye composition when applied to 95% naturally white hair for 20 minutes, after rinsing and shampooing, imparts thereto a clear silvery gray blue shade.

EXAMPLE 28

The following hair dye composition is prepared:

| | G. |
|---|---|
| Dye of Example 4 | 0.05 |
| Isopropyl alcohol, 96° titer | 40 |
| Water, q.s.p. | 100 |

This hair dye composition when applied to 95% naturally white hair for 10 minutes, after rinsing and shampooing, imparts thereto a silvery clear green shade.

What is claimed is:

1. A composition for dyeing human hair comprising an aqueous solution of at least one compound selected from the group consisting of
(a) an indamine having the formula

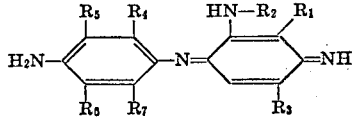

wherein
$R_1$ is selected from the group consisting of hydrogen and lower alkyl,
$R_2$ is selected from the group consisting of hydrogen and acetyl,
$R_3$ is selected from the group consisting of hydrogen, lower alkyl and lower alkoxy,
$R_4$ is lower alkoxy,
$R_5$ is selected from the group consisting of hydrogen and lower alkyl,
$R_6$ is lower alkyl and
$R_7$ is hydrogen
(b) an acid salt of said indamine in (a) and
(c) a double chloride of zinc and said indamine in (a), said compound being present in amounts of about 0.002 to 1% by weight of said composition.

2. The composition of claim 1 having a pH between 4-10.

3. The composition of claim 1 having a pH between 6-9.

4. The composition of claim 1 wherein the aqueous solution further contains a lower alkanol and a film forming resin selected from the group consisting of polyvinylpyrrolidone having a molecular weight ranging from 10,000–70,000 and a copolymer of 10% crotonic acid and 90% vinyl acetate having a molecular weight ranging from 45,000–50,000 in amounts of about 1 to 3% based on the weight of said composition.

5. The composition of claim 4 wherein said lower alkanol is selected from the group consisting of ethanol and isopropanol.

6. The composition of claim 4 wherein said lower alkanol is present in amounts ranging from about 20–50 percent by weight of said composition.

7. The composition of claim 4 wherein said compound is present in amounts of about 0.002 to 0.5% by weight of said composition.

8. The composition of claim 1 wherein said compound is selected from the group consisting of
the monohydrate of acetate of N-[(4'-amino-2'-methoxy-5' - methyl)phenyl]-3-amino-6-methoxy benzoquinone diimine,
the semihydrate of the acetate of N-[(4'-amino-2'-methoxy-5'-methyl)phenyl]-3-amino-6-methyl benzoquinone diimine,
the hydrochloride of N-[(4'-amino-2'-methoxy-5'-methyl)phenyl]-3-amino-6-methyl benzoquinone diimine,
N-[(4'-amino-2'-methoxy-5'-methyl)phenyl]-3-amino-6-methyl benzoquinoneimine,
the double chloride of zinc and N-[(4'-amino-2'-methoxy-5'-methyl)phenyl]-3-amino-6-methyl benzoquinone diimine,
the acetate of N-[(4'-amino-2'-methoxy-5'-methyl) phenyl]-3-amino-2,6-dimethyl benzoquinone diimine,
the acetate of N-[(4'-amino-2'-methoxy-3',5'-dimethyl) phenyl]-3-amino-2,6-dimethyl benzoquinone diimine,
the persulfate of N-[4'-amino-2'-methoxy-3',5'-dimethyl) phenyl]-3-acetylamino-6-methyl benzoquinone diimine,
the acetate of N-[(4'-amino-2'-methoxy-3',5'-dimethyl) phenyl]-3-acetylamino-6-methyl benzoquinone diimine, and
the perchlorate of N-[(4'-amino-2'-methoxy-3',5'-dimethyl)phenyl]-3-acetylamino benzoquinone diimine.

9. A composition for dyeing human hair comprising an aqueous solution of at least one compound selected from the group consisting of
(a) an indamine of the formula

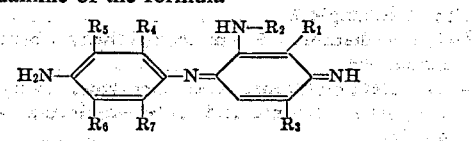

wherein
$R_1$ is selected from the group consisting of hydrogen and methyl,
$R_2$ is selected from the group consisting of hydrogen and acetyl,
$R_3$ is selected from the group consisting of hydrogen, methyl and methoxy,
$R_4$ is methoxy,
$R_5$ is selected from the group consisting of hydrogen and methyl,
$R_6$ is methyl and
$R_7$ is hydrogen
(b) an acid salt of said indamine in (a) and
(c) a double chloride of zinc and said indamine in (a), said compound being present in amounts of about 0.002 to 1% by weight of said composition.

10. A process for dyeing human hair which comprises applying to said hair in an amount effective to dye the same an aqueous solution containing 0.002 to 1% by weight of a compound selected from the group consisting of
(a) an indamine having the formula

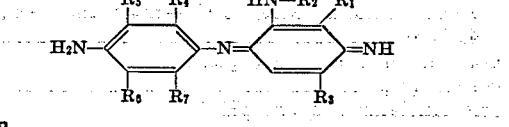

wherein
$R_1$ is selected from the group consisting of hydrogen and lower alkyl,
$R_2$ is selected from the group consisting of hydrogen and acetyl,
$R_3$ is selected from the group consisting of hydrogen, lower alkyl and lower alkoxy,
$R_4$ is lower alkoxy,
$R_5$ is selected from the group consisting of hydrogen and lower alkyl,
$R_6$ is lower alkyl and
$R_7$ is hydrogen (b) an acid salt of said indamine in (a) and
(c) a double chloride of zinc and said indamine in (a), said composition remaining in contact with said hair for a period ranging from about 3 to 30 minutes, rinsing and drying said hair.

References Cited

UNITED STATES PATENTS

| | | | |
|---|---|---|---|
| 248,246 | 10/1881 | Witt | 260—396 N X |
| 249,136 | 11/1881 | Witt | 260—396 N X |
| 1,102,028 | 6/1914 | Fischer | 96—100 X |

OTHER REFERENCES

Kass et al., Journal of the Society of Cosmetic Chemists, April 1961, pp. 151–153.

STANLEY J. FRIEDMAN, Primary Examiner

U.S. Cl. X.R.

8—10, 10.2, 11; 260—396 N